(12) United States Patent
Nagato et al.

(10) Patent No.: US 8,055,202 B2
(45) Date of Patent: Nov. 8, 2011

(54) MEASURING APPARATUS AND AREA QUALITY MEASURING METHOD

(75) Inventors: Rie Nagato, Kamakura (JP); Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1191 days.

(21) Appl. No.: 11/697,460

(22) Filed: Apr. 6, 2007

(65) Prior Publication Data
US 2007/0243829 A1    Oct. 18, 2007

(30) Foreign Application Priority Data
Apr. 7, 2006    (JP) ................ P2006-106875

(51) Int. Cl.
*H04B 17/00* (2006.01)
(52) U.S. Cl. .............. 455/67.11; 455/522; 370/318
(58) Field of Classification Search .......... 455/67.11, 455/522; 370/318, 241, 332
See application file for complete search history.

(56) References Cited

FOREIGN PATENT DOCUMENTS

| | | |
|---|---|---|
| JP | 2001-036462 | 2/2001 |
| JP | 2002-164829 | 6/2002 |
| JP | 2002-204199 | 7/2002 |
| WO | WO 96/38997 | 12/1996 |
| WO | WO99/14972 | * 3/1999 |
| WO | WO 99/14972 | 3/1999 |

OTHER PUBLICATIONS

"Digital cellular telecommunications system (Phase 2+); Radio subsystem link control (3GPP TS 45.008 version 5.11.0 Release 5); ETSI TS 145 008." Global System for Mobile Communications, European Telecommunications Standards Institute, 2003. pp. 1-109.
Office Action issued Jan. 18, 2011, in Japanese Patent Application No. 2006-106875 with English translation.

* cited by examiner

*Primary Examiner* — Nay A Maung
*Assistant Examiner* — Angelica Perez
(74) *Attorney, Agent, or Firm* — Oblon, Spivak, McClelland, Maier & Neustadt, L.L.P.

(57) ABSTRACT

A measuring apparatus for measuring service quality in an area in a communication system, in which a plurality of base stations use one frequency band for transmitting downlink signals, includes: a receiver configured to receive constant power signals that are the downlink signals transmitted by the base stations through constant power channels in which transmission powers are constant; a reception power measuring unit configured to measure reception powers of the constant power signals transmitted by the respective base stations; a reception power selector configured to select a reception power which is a base for measurement of the quality in the area, out of the reception powers measured by the reception power measuring unit; and an area quality measuring unit configured to measure the quality in the area on the basis of the reception power selected by the reception power selector, and a total of the reception powers not selected by the reception power selector.

4 Claims, 9 Drawing Sheets

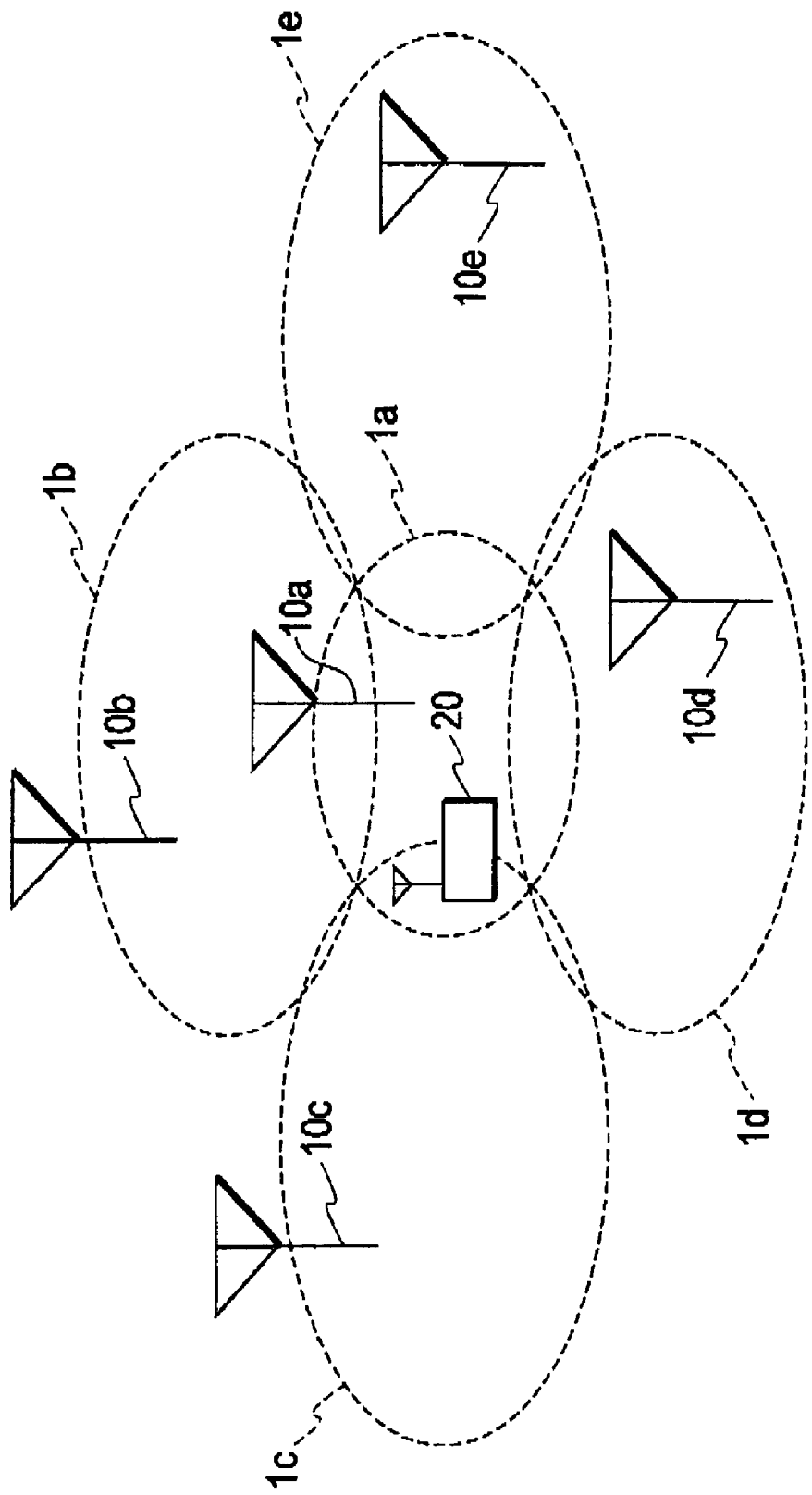

| NAME OF BASE STATION | MAXIMUM TRANSMISSION POWER (mV) | TRANSMISSION POWER OF CONSTANT POWER CHANNEL (mV) | RATIO |
|---|---|---|---|
| BASE STATION 10a | $P_{max,1}$ | $P_{static,1}$ | $r_1$ |
| BASE STATION 10b | $P_{max,2}$ | $P_{static,2}$ | $r_2$ |
| BASE STATION 10c | $P_{max,3}$ | $P_{static,3}$ | $r_3$ |
| BASE STATION 10d | $P_{max,4}$ | $P_{static,4}$ | $r_4$ |
| BASE STATION 10e | $P_{max,5}$ | $P_{static,5}$ | $r_5$ |

| FEATURE OF AREA | FEATURE OF MEASUREMENT ENVIRONMENT | |
|---|---|---|
| | Outdoor | Indoor |
| URBAN AREA | $R_{a,Outdoor}$ | $R_{a,Indoor}$ |
| SUBURBAN AREA | $R_{b,Outdoor}$ | $R_{b,Indoor}$ |
| RURAL AREA | $R_{c,Outdoor}$ | $R_{c,Indoor}$ |
| ⋮ | ⋮ | ⋮ |

| FEATURE OF AREA | FEATURE OF MEASUREMENT ENVIRONMENT | |
|---|---|---|
| | Outdoor | Indoor |
| URBAN AREA | $I_{a,Outdoor}$ | $I_{a,Indoor}$ |
| SUBURBAN AREA | $I_{b,Outdoor}$ | $I_{b,Indoor}$ |
| RURAL AREA | $I_{c,Outdoor}$ | $I_{c,Indoor}$ |
| ⋮ | ⋮ | ⋮ |

MEASURING APPARATUS AND AREA QUALITY MEASURING METHOD

CROSS REFERENCE TO RELATED APPLICATIONS

This application is based upon and claims the benefit of priority from prior Japanese Patent Application No. 2006-106875, filed on April 7; the entire contents of which are incorporated herein by reference.

BACKGROUND OF THE INVENTION

1. Field of the Invention

The present invention relates to a measuring apparatus and an area quality measuring method, which measure service quality in an area by using a signal-to-interference ratio (SIR) and the like.

2. Description of the Related Art

Heretofore, a communication system (for example, a code division multiple access (CDMA) communication system), in which one frequency band is used in communication channels concurrently set between mobile stations and a base station, has been widely known in general.

Specifically, in the CDMA communication system, the plurality of communication channels concurrently set between the plurality of mobile stations and the base station are identified by using spreading codes. In such a CDMA communication system, since one frequency band is used in the plurality of communication channels set concurrently, a certain communication channel is subjected to interference from the other communication channels.

Hence, in the CDMA communication system, a ratio of reception power of a signal transmitted by using the certain communication channel, to reception powers of signals (interference signals) transmitted by using the other communication channels (a signal-to-interference ratio; hereinafter, "SIR") needs to be maintained at or above a predetermined threshold value at which the certain communication channel can be identified with the spreading code.

Here, the number of concurrently-settable communication channels, in which the SIRs are maintained at or above the predetermined threshold value, is considered as one of indices that indicate service quality in an area. Specifically, when the reception powers of the interference signals (I) are small, the SIR is maintained at, or above the predetermined threshold value even if transmission power of the signal (S) is made small. Hence, there is room for increasing the number of concurrently-settable communication channels when the maximum transmission powers of the mobile stations and the base station are constant.

On the other hand, when the reception powers of the interference signals (I) are large, the reception power of the signal (S) needs to be large. Otherwise, the SIR cannot be maintained at, or above the predetermined threshold value. For this reason, there is no room for increasing the number of concurrently-settable communication channels when the maximum transmission powers of the mobile stations and the base station are constant.

As a method for measuring such service quality in an area by using the SIR as described above, a method using a constant power channel for use in a case of transmitting a signal with constant transmission power has been proposed (for example, Japanese Patent Application Laid-Open Publication No. 2001-36462 (Claim 1, FIG. 3, Paragraph 0031, and the like)). Note that the constant power channel is a channel for which a transmission power control is not performed.

According to this method, since the constant power channel is a channel in which the transmission power is not controlled, the reception power of the signal transmitted by using the constant power channel is only influenced by geographical factors of the concerned area.

Thus, accuracy in measuring the service quality in an area can be enhanced in comparison with a case where the service quality in the area is measured by using the reception power of the signal transmitted through the channel in which the transmission power is controlled.

Meanwhile, in the CDMA communication system, a total value of the transmission powers of the signals transmitted by the base station to the mobile stations is varied in response to the number of mobile stations concurrently communicating with the base station. In other words, when the signal transmitted by using a certain communication channel is set as a measurement target, a total of the reception powers of the interference signals transmitted through other communication channels is varied.

As a result, in the above-described method, when the SIR is measured while setting the signal transmitted by using the certain communication channel to be the measurement target, the SIR is undesirably varied in response to a timing of measuring the SIR (that is, in response to the number of mobile stations concurrently communicating with the base station).

As described above, in the conventional method, the SIR is undesirably varied in response to the number of mobile stations concurrently communicating with the base station. For this reason, accuracy in measuring the service quality in an area cannot be enhanced sufficiently.

In particular, while a communication system is designed on the supposition of a case where the number of mobile stations concurrently communicating with the base station is the maximum (hereinafter, "most frequent case"), a measured SIR is often not an SIR of the most frequent case. Accordingly, it has been difficult to design the communication system efficiently.

SUMMARY OF THE INVENTION

One feature of the present invention is summarized in that a measuring apparatus for measuring service quality in an area in a communication system in which a plurality of base stations use one frequency band for transmitting downlink signals, includes a receiver (an antenna 21), a reception power measuring unit (a reception power measuring unit 22), a reception power selector (a measurement target selector 23), and an area quality measuring unit (an area quality calculation unit 24). The receiver receives constant power signals that are the downlink signals transmitted by the base stations through constant power channels (for example, common pilot channels (CPICHs)) in which transmission powers are constant. The reception power measuring unit measures reception powers of the constant power signals transmitted by the respective base stations. The reception power selector selects a reception power which is a base for measurement of the service quality in the area. This reception power is selected out of the reception powers measured by the reception power measuring unit. The area quality measuring unit measures the service quality in the area on the basis of the reception power selected by the reception power selector, and a total of the reception powers not selected by the reception power selector.

According to such a feature, the area quality measuring unit measures the service quality in the area on the basis of the reception power selected by the reception power selector and the total of the reception powers not selected by the reception power selector. Moreover, the constant power signals are the downlink signals that the plurality of base stations transmit with fixed transmission power.

Specifically, the area quality measuring unit can measure the service quality in the area without being affected by the number of mobile stations concurrently communicating with the base stations even if the number of mobile stations is varied. Thus, the measuring apparatus can sufficiently enhance the accuracy in measuring the service quality in the area.

One feature of the present invention according to the above-described feature is summarized in that the measuring apparatus further includes a ratio information obtaining unit (a transmission power information DB 25, and a reception power converter 26) and a reception power converter (a reception power converter 26). The ratio information obtaining unit obtains conversion ratios each of which is a ratio of the transmission power of the constant power channel corresponding to the respective base stations, to the maximum transmission power corresponding to the respective base stations. The reception power converter converts the reception powers measured by the reception power measuring unit on the basis of the respective conversion ratios obtained by the ratio information obtaining unit, and calculates the converted reception powers for the respective constant power channels. Here, the area quality measuring unit measures the service quality in the area on the basis of the converted reception power corresponding to the reception power selected by the reception power selector, and a total of the converted reception powers corresponding to the reception powers not selected by the reception power selector.

One feature of the present invention according to the above-described feature is summarized in that the measuring apparatus further includes a ratio information obtaining unit (a representative value DB 27 and a reception power converter 26*a*) and a reception power converter (a reception power converter 26*a*). The ratio information obtaining unit obtains a conversion ratio representative value which is a ratio of the transmission powers of the respective constant power channels, to the maximum transmission powers of the respective base stations, and the conversion ratio representative value is determined in response to a geographical feature of the area. The reception power converter converts the reception powers measured by the reception power measuring unit on the basis of the conversion ratio representative value obtained by the ratio information obtaining unit, and calculates the converted reception powers for the respective constant power channels. Hence, the area quality measuring unit measures the service quality in the area on the basis of the converted reception power corresponding to the reception power selected by the reception power selector, and a total of the converted reception powers corresponding to the reception powers not selected by the reception power selector.

One feature of the present invention according to the above-described feature is summarized in that the area quality measuring unit measures the service quality in the area on the basis of thermal noise generated by the measuring apparatus, in addition to the converted reception power corresponding to the reception power selected by the reception power selector and the total of the converted reception powers corresponding to the reception powers not selected by the reception power selector.

One feature of the present invention according to the above-described feature is summarized in that the measuring apparatus further includes an interference power obtaining unit (an interference power DB 28 and an area quality calculation unit 24) configured to obtain an interference power estimated value determined in response to a geographical feature of the area. Here, in a case where the reception power measuring unit measures only one reception power, the area quality measuring unit measures the service quality in the area on the basis of the reception power measured by the reception power measuring unit and the interference power estimated value obtained by the interference power obtaining unit.

One feature of the present invention is summarized in that an area quality measuring method for measuring service quality in an area in a communication system in which a plurality of base stations use one frequency band for transmitting downlink signals includes: a step A of receiving constant power signals which are the downlink signals that the respective base stations transmit by using constant power channels in which transmission powers are constant; a step B of measuring reception powers of the constant power signals transmitted by the base stations; a step C of selecting a reception power which is a base for measurement of the service quality in the area, out of the reception powers measured in the step B; and a step D of measuring the service quality in the area on the basis of the reception power selected in the step C and a total of the reception powers not selected in the step C.

BRIEF DESCRIPTION OF THE DRAWINGS

FIG. 1 is a view showing a configuration of a communication system according to a first embodiment of the present invention.

DETAILED DESCRIPTION OF THE EMBODIMENTS

Figure 2A:
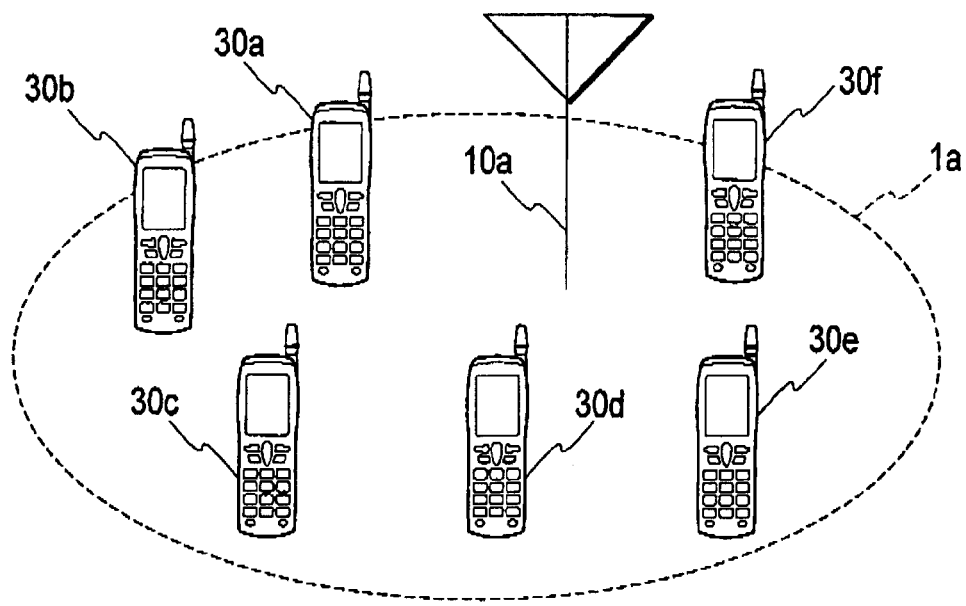
FIGS. 2A and 2B are first views for explaining transmission power of a signal transmitted by a base station 10*a* according to the first embodiment of the present invention.

A description will be given below of embodiments of the present invention with reference to the drawings. Incidentally, in the drawings, the same or similar reference numerals denote the same or similar portions. Meanwhile, it should be noted that the drawings are schematic.

Since the drawings are schematic, it should be noted that ratios of the respective dimensions, and the like, are different from actual ones. Hence, specific dimensions and the like should be determined in consideration of the following description. Moreover, it is a matter of course that the drawings also include portions different in dimensional relationship and ratio therebetween.

First Embodiment

Configuration of Communication System

A description will be given below of a configuration of a communication system according to a first embodiment of the present invention with reference to the drawings. FIG. 1 is a view showing the configuration of the communication system according to the first embodiment of the present invention.

As shown in FIG. 1, the communication system is composed of a plurality of base stations 10 (base stations 10a to 10e). The communication system is a system in which the plurality of base stations 10 use one frequency band for transmitting downlink signals. For example, the communication system is a code division multiple access (CDMA) communication system in which the base stations 10 and channels are identified by using spreading codes. Moreover, the communication system may be one in which a multi-input multi-output (MIMO) technology is used.

Each of the base stations 10 individually manage a corresponding one of cells 1 (cells 1a to 1e). Specifically, the cell 1a is an area managed by the base station 10a, and is a range where the signal transmitted by the base station 10a effectively reaches. Similarly, the cells 1a to 1e are areas respectively managed by the base stations 10b to 10e, and are ranges where the signals transmitted by the base stations 10b to 10e effectively reach. Note that the signals transmitted respectively from the base stations 10a to 10e reach as interference signals even to the outside of the cells 1a to 1e.

Moreover, each of the base stations 10 transmits the downlink signals (hereinafter, "constant power signals") by using constant power channels in which transmission powers are constant (that is, constant power channels for which a transmission power is not controlled). Note that channels which can be used as the constant power channels are, for example, common pilot channels (CPICHs) defined by the 3GPP, and the like.

A measuring apparatus 20 which measures service quality in the area, is located in the cell 1a managed by the base station 10a. The measuring apparatus 20 receives the constant power signals transmitted by the base stations 10 by using the constant power channels, and measures reception powers of the constant power signals. Moreover, on the basis of the reception powers of the constant power signals, the measuring apparatus 20 measures the service quality (hereinafter, "area quality") in the area (hereinafter, "measurement area k") in which the measuring apparatus 20 is located.

(Transmission Power of Signal Transmitted by Base Station)

A description will be given below of transmission power of a signal transmitted by a base station according to the first embodiment of the present invention with reference to the drawings. FIGS. 2 and 3 are views for explaining the transmission power of the signal transmitted by the base station 10a according to the first embodiment of the present invention.

First, a description will be given of the transmission power by taking, as an example, a case where the plurality of mobile stations are located in the cell 1a managed by the base station 10a.

As shown in FIG. 2A, a plurality of the mobile stations (mobile stations 30a to 30f) are located in the cell 1a managed by the base station 10a. In the following description, users of the mobile stations 30a to 30f are referred to as users a to f, respectively. Moreover, the base station 10a is concurrently communicating with the mobile stations 30a to 30f.

Figure 2B:
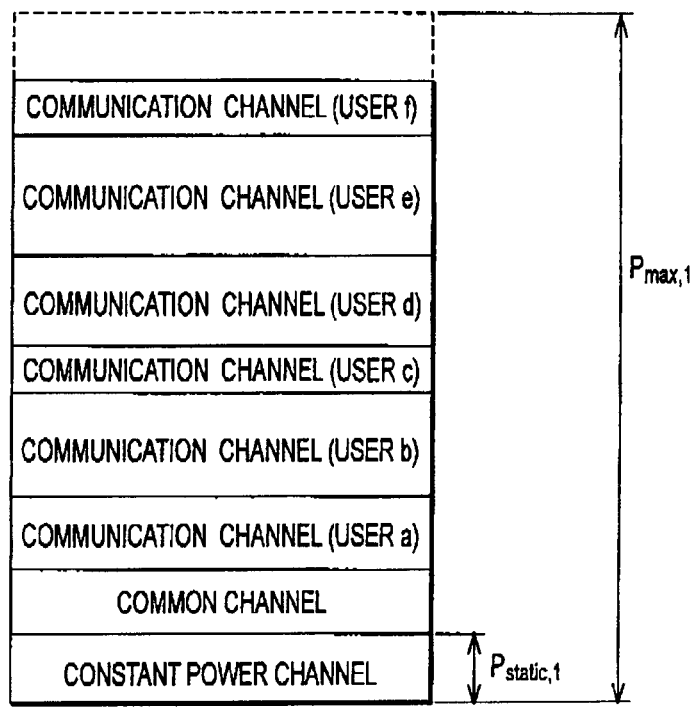

In a state shown in FIG. 2A, the total transmission power of the signals transmitted by the base station 10a is a total of transmission powers for the constant power channel, and a common channel and the transmission powers for the communication channels (for the users a to f), as shown in FIG. 2B.

Next, a description will be given of the transmission power by taking, as an example, a case where a single mobile station is located in the cell 1a managed by the base station 10a.

Figure 3A:
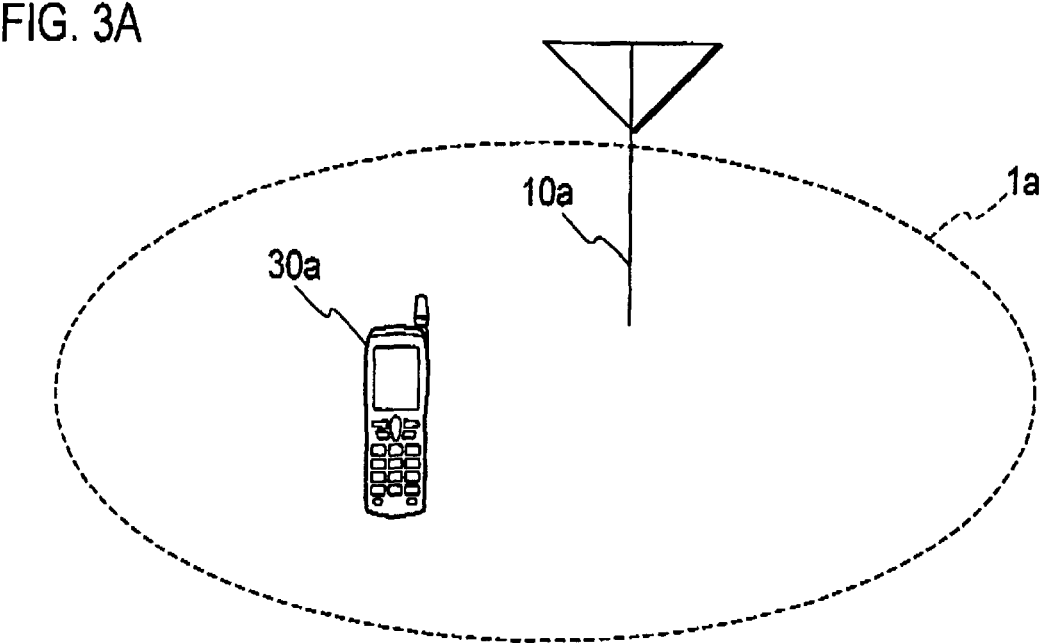
FIGS. 3A and 3B are second views for explaining the transmission power of the signal transmitted by the base station 10*a* according to the first embodiment of the present invention.

Meanwhile, as shown in FIG. 3A, only the mobile station 30a is located in the cell 1a managed by the base station 10a. The base station 10a is concurrently communicating with the mobile station 30a.

Figure 3B:
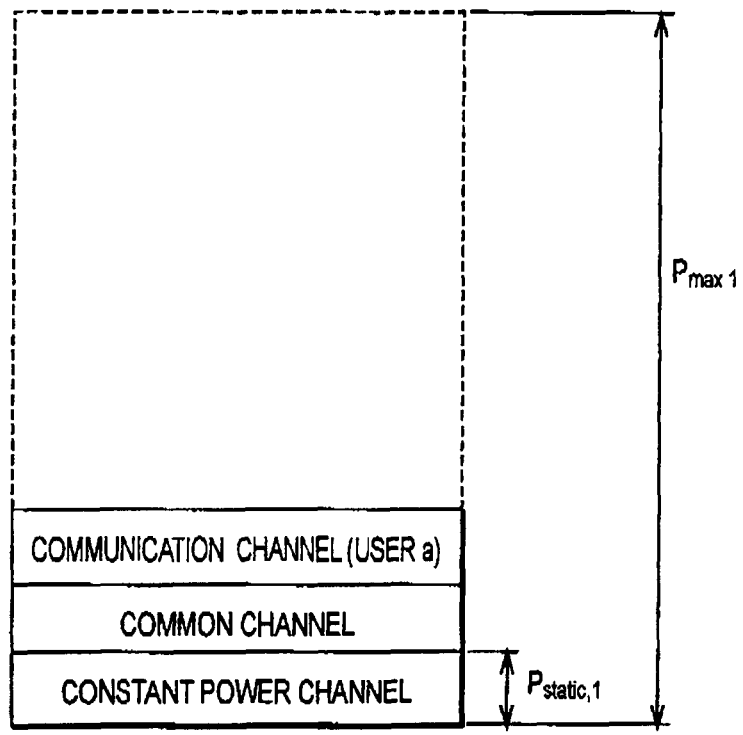

In a state shown in FIG. 3A, the total transmission power of the signals transmitted by the base station 10a is a total of the transmission powers for the constant power channel and the common channel and the transmission power for the communication channel (user a) as shown in FIG. 3B.

As shown in FIGS. 2A to 3B, the total transmission power of the signals transmitted by the base station 10a is varied in response to the number of mobile stations 30 concurrently communicating with the base station 10a. Accordingly, an amount of the interference signals received by the measuring apparatus 20 is also varied in response to the number of mobile stations 30 concurrently communicating with the base station 10a.

(Configuration of Measuring Apparatus)

Figure 4:
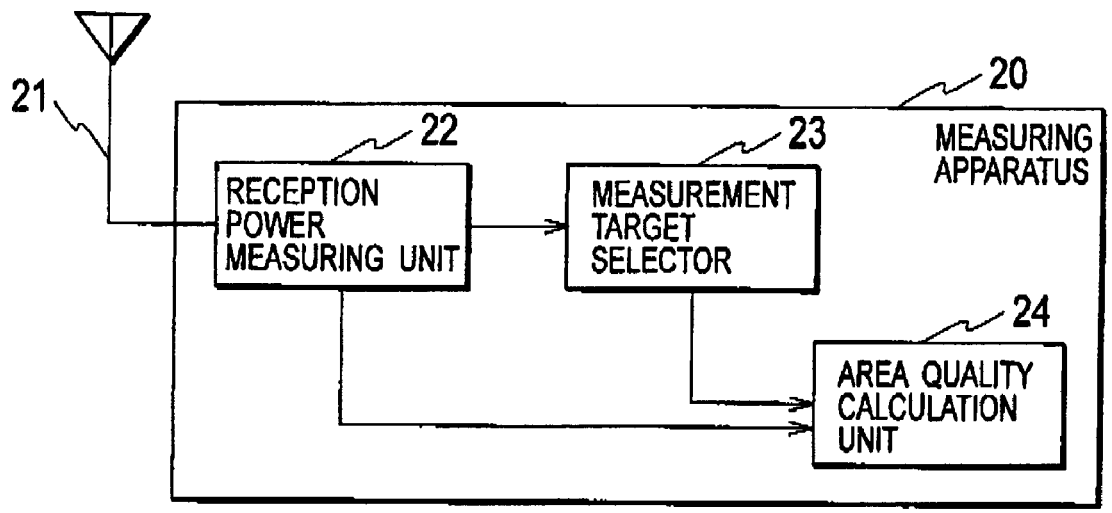
FIG. 4 is a block diagram showing a configuration of a measuring apparatus 20 according to the first embodiment of the present invention.

A description will be given below of a measuring apparatus according to the first embodiment of the present invention with reference to the drawing. FIG. 4 is a block diagram showing the configuration of the measuring apparatus 20 according to the first embodiment of the present invention.

As shown in FIG. 4, the measuring apparatus 20 includes an antenna 21, a reception power measuring unit 22, a measurement target selector 23, and an area quality calculation unit 24. Note that FIG. 4 only shows characteristic constituents of the measuring apparatus 20 according to the first embodiment of the present invention. Hence, it is needless to say that the measuring apparatus 20 may include constituents necessary for the communication, such as an AD converter, a DA converter, and a frequency modulator.

In the first embodiment of the present invention, as described above, the measuring apparatus 20 is located in the cell 1a managed by the base station 10a, and measures the area quality in the measurement area k on the basis of the constant power signals that the respective base stations 10 transmit by using the constant power channels.

The antenna 21 receives the constant power signals transmitted by the base stations 10a to 10e by using the constant power channels. Note that the antenna 21 may receive the downlink signals transmitted by the base stations 10a to 10e by using the common channels and the communication channels. Moreover, the antenna 21 may receive uplink signals transmitted by the mobile stations 30 located in the cells 1a to 1e.

The reception power measuring unit 22 measures the reception powers of the constant power signals transmitted by the base stations 10a to 10e by using the constant power channels.

The measurement target selector 23 selects the reception power of one constant power signal which is a base for measurement of the area quality, from the reception powers of the constant power signals measured by the reception power measuring unit 22. Specifically, the measurement target selector 23 selects the largest reception power of the constant power signals. The measurement target selector 23 may select the reception power of the constant power signal in which a signal-to-interference ratio (SIR) is the largest. Furthermore, the measurement target selector 23 may acquire the transmission powers of the constant power signals in advance from the base stations 10, and select the reception power of the constant power signal in which a path loss calculated on the basis of the transmission power of the constant power signal and the reception power of the constant power signal is the smallest.

Here, the reception power of the constant power signal, which is selected by the measurement target selector 23, is reception power of a downlink signal having a high possibility of being received, as the effective downlink signal, by the mobile station 30 in the measurement area k. Meanwhile, the reception powers of the constant power signals, which are not selected by the measurement target selector 23, are reception powers of downlink signals having a high possibility of being received, as the interference signals, by the mobile stations 30 in the measurement area k.

In the first embodiment of the present invention, a description will be given of the configuration of the measuring apparatus 20 on the supposition that the reception power of the constant power signal transmitted by the base station 10a through the constant power channel is selected by the measurement target selector 23.

The area quality calculation unit 24 calculates the area quality in the measurement area k on the basis of the reception power of the constant power signal selected by the measurement target selector 23, and a total of the reception powers of the constant power signals (interference signals) not selected by the measurement target selector 23.

Specifically, the area quality calculation unit 24 calculates the area quality (Gk) of the measurement area k on the basis of the following expression (1). In the expression (1), Rx1 is the reception power of the constant power signal transmitted by the base station 10a. Similarly, Rx2 to Rx5 are the reception powers of the constant power signals transmitted by the respective base stations 10b to 10e.

[Expression 1]

$$Gk = Rx1 \bigg/ \sum_{i=2}^{5} Rxi \qquad (1)$$

(Operation of Measuring Apparatus)

Figure 5:
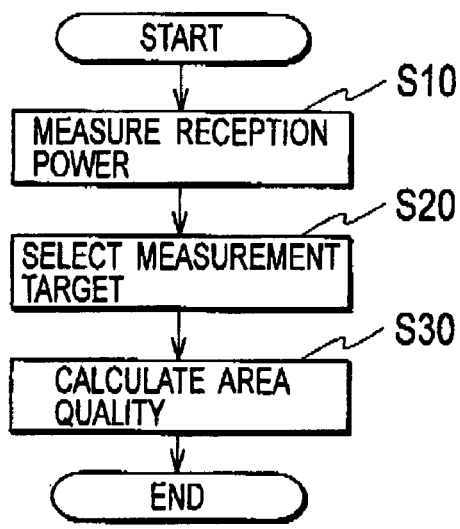
FIG. 5 is a flowchart showing operations of the measuring apparatus 20 according to the first embodiment of the present invention.

A description will be given below of operations of the measuring apparatus according to the first embodiment of the present invention with reference to the drawing. FIG. 5 is a flowchart showing operations of the measuring apparatus 20 according to the first embodiment of the present invention.

As shown in FIG. 5, in Step 10, the measuring apparatus 20 measures the reception powers (Rx1 to Rx5) of the constant power signals that the respective base stations 10a to 10e transmit by using the constant power channels.

In Step 20, the measuring apparatus 20 selects the reception power of a certain constant power signal which is a base for measurement of the area quality, from the reception powers of the constant power signals measured in Step 10. As described above, the measuring apparatus 20 selects the reception power (Rx1) of the constant power signal transmitted by the base station 10a through the constant power channel.

In Step S30, the measuring apparatus 20 calculates the area quality in the measurement area k on the basis of the reception power of the constant power signal selected in Step 20, and the total of the reception powers of the constant power signals not selected in Step 20. Specifically, as described above, the measuring apparatus 20 calculates the area quality (Gk) on the basis of the expression (1).

[Expression 2]

$$Gk = Rx1 \bigg/ \sum_{i=2}^{5} Rxi \qquad (1)$$

(Effect)

In the measuring apparatus 20 according to the first embodiment of the present invention, the area quality calculation unit 24 calculates the area quality in the measurement area k on the basis of the reception power (Rx1) of the constant power signal selected by the measurement target selector 23, and the total of the reception powers (Rx2 to Rx4) of the constant power signals not selected by the measurement target selector 23. The constant power signals are the downlink signals that the plurality of base stations 10 (base stations 10a to 10e) transmit with the fixed transmission power.

Specifically, as shown in FIGS. 2A to 3B, the area quality calculation unit 24 can calculate the area quality in the measurement area k without being affected by the number of mobile stations 30 concurrently communicating with the base station 10 even if the number of mobile stations 30 is varied. Thus, the measuring apparatus 20 can sufficiently enhance accuracy in measuring the area quality.

Second Embodiment

A description will be given below of a second embodiment of the present invention with reference to the drawings. Incidentally, the following description will be mainly given of different points of the second embodiment from the above-described first embodiment.

Specifically, in the above-described first embodiment, the measuring apparatus 20 calculates the area quality in the measurement area k on the basis of the reception powers of the constant power signals transmitted by the base stations 10.

Meanwhile, in the second embodiment, the measuring apparatus 20 converts the reception powers of the constant power signals transmitted by the base stations 10 by using ratios (conversion ratios) of the transmission powers of the constant power channels to the maximum transmission powers of the respective base stations 10. Thereafter, the measuring apparatus 20 calculates the area quality in the measurement area k on the basis of the converted reception powers of the constant power signals.

(Configuration of Measuring Apparatus)

Figures 6, 7:
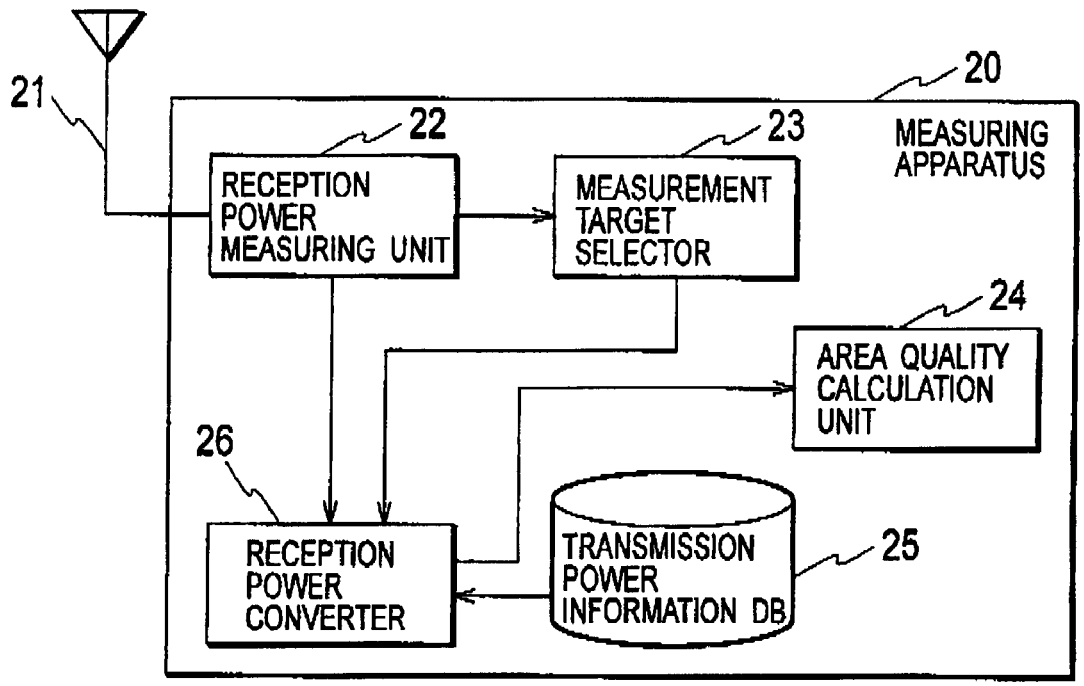
FIG. 6 is a block diagram showing a configuration of a measuring apparatus 20 according to a second embodiment of the present invention.
FIG. 7 is a view showing an example of information stored in a transmission power information DB 25 according to the second embodiment of the present invention.

A description will be given below of a configuration of the measuring apparatus according to the second embodiment of the present invention with reference to the drawings. FIG. 6 is a block diagram showing the configuration of the measuring apparatus 20 according to the second embodiment of the present invention.

As shown in FIG. 6, in addition to the configuration shown in FIG. 4, the measuring apparatus 20 includes a transmission power information DB 25, and a reception power converter 26. Since the configurations of the antenna 21, the reception power measuring unit 22, and the measurement target selector 23 are similar to those of the above-described first embodiment, a description thereof will be omitted.

As shown in FIG. 7, the transmission power information DB 25 stores the maximum transmission powers ($P_{max, i}$) of the base stations 10, the transmission powers ($P_{static, i}$) of the constant power channels of the base stations 10, and the conversion ratios ($r_i$) of the constant power channels occupied in the maximum transmission powers, in association with the relevant base stations 10.

With regard to the information stored in the transmission power information DB 25, the measuring apparatus 20 may have the information in advance, or the measuring apparatus 20 may acquire the information as appropriate from a network.

The reception power converter 26 converts the reception power (Rxi) of the constant power signal measured by the reception power measuring unit 22, on the basis of each conversion ratio ($r_i$) stored in the transmission power information DB 25, and obtains the converted reception power. Specifically, the reception power converter 26 divides the reception power (Rxi) of the constant power signal by the conversion ratio ($r_i$). Thereby, the converted reception power ($Rxi/r_i$) is obtained.

Note that the reception power converter 26 obtains the converted reception power ($Rxi/r_i$) each for the reception power of the constant power signal, which is selected by the measurement target selector 23, and the reception powers of the constant power signals, which are not selected by the measurement target selector 23.

The area quality calculation unit 24 measures the area quality in the measurement area k by using the converted reception power ($RXi/r_i$) obtained by the reception power converter 26. Specifically, the area quality calculation unit 24 calculates the area quality (Gk) of the measurement area k on the basis of the following expression (2).

In the second embodiment, a description will be given of the configuration of the measuring apparatus 20 on the supposition that the reception power of the constant power signal, which the base station 10a transmits by using the constant power channel, is selected by the measurement target selector 23 in a similar way to the above-described first embodiment.

[Expression 3]

$$Gk = (Rx1/r_1) \bigg/ \left( \sum_{i=2}^{5} Rxi/r_i \right) \qquad (2)$$

(Operation of Measuring Apparatus)

Figure 8:
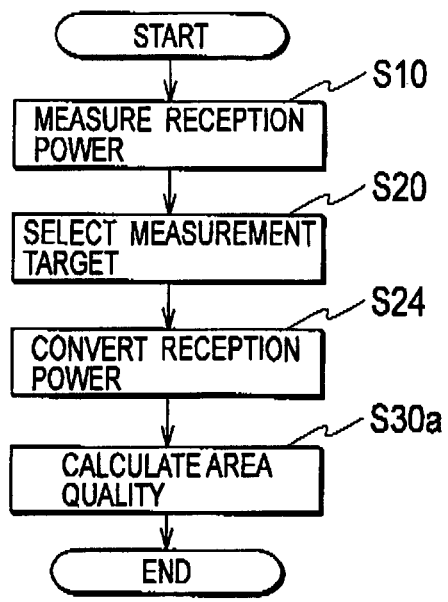
FIG. 8 is a flowchart showing operations of the measuring apparatus 20 according to the second embodiment of the present invention.

A description will be given of operations of the measuring apparatus according to the second embodiment of the present invention with reference to the drawings. FIG. 8 is a flowchart showing operations of the measuring apparatus 20 according to the second embodiment of the present invention. Since Steps 10 and 20 are similar to those of the processing in the above-described first embodiment, a description thereof will be omitted.

As shown in FIG. 8, in Step 24, on the basis of the conversion ratio ($r_i$) stored in the transmission power information DB 25, the measuring apparatus 20 converts the reception power (Rxi) of the constant power signal, which is measured by the reception power measuring unit 22, and obtains the converted reception power ($Rxi/r_i$).

In Step 30a, the measuring apparatus 20 calculates the area quality in the measurement area k on the basis of the converted reception power ($Rxi/r_i$) obtained in Step 24. Specifically, as described above, the measuring apparatus 20 calculates the area quality (Gk) on the basis of the expression (1).

[Expression 4]

$$Gk = (Rx1/r_1) \bigg/ \left( \sum_{i=2}^{5} Rxi/r_i \right) \qquad (2)$$

(Effect)

In the measuring apparatus 20 according to the second embodiment of the present invention, the reception power converter 26 converts the reception power (Rxi) of the constant power signal, which is measured by the reception power measurement unit 22, and obtained the converted reception power ($Rxi/r_i$). Moreover, the area quality calculation unit 24 calculates the area quality (Gk) of the measurement area k by using the converted reception power ($Rxi/r_i$) obtained by the reception power converter 26.

Hence, the measuring apparatus 20 can measure the area quality (Gk) of the measurement area k on the supposition of a case (the most frequent case) where the total of the transmission powers of the downlink signals transmitted by the base stations 10 reaches the maximum transmission power.

The area quality (Gk) measured on the supposition of the most frequent case is useful information in a case of designing the communication system, and the communication system can be designed efficiently.

Third Embodiment

A description will be given below of a third embodiment of the present invention with reference to the drawings. The following description will be mainly made of different points of the third embodiment from those of the above-described first embodiment and second embodiment.

Specifically, in the above-described second embodiment, the reception powers of the constant power signals transmitted by the respective base stations 10 are converted by using the conversion ratios ($R_i$) corresponding to the respective base stations 10.

Meanwhile, in the third embodiment, the reception powers of the constant power signals transmitted by the base stations 10 are converted by using a conversion ratio representative value (r) determined in response to geographical features.

(Configuration of Measuring Apparatus)

Figure 9:
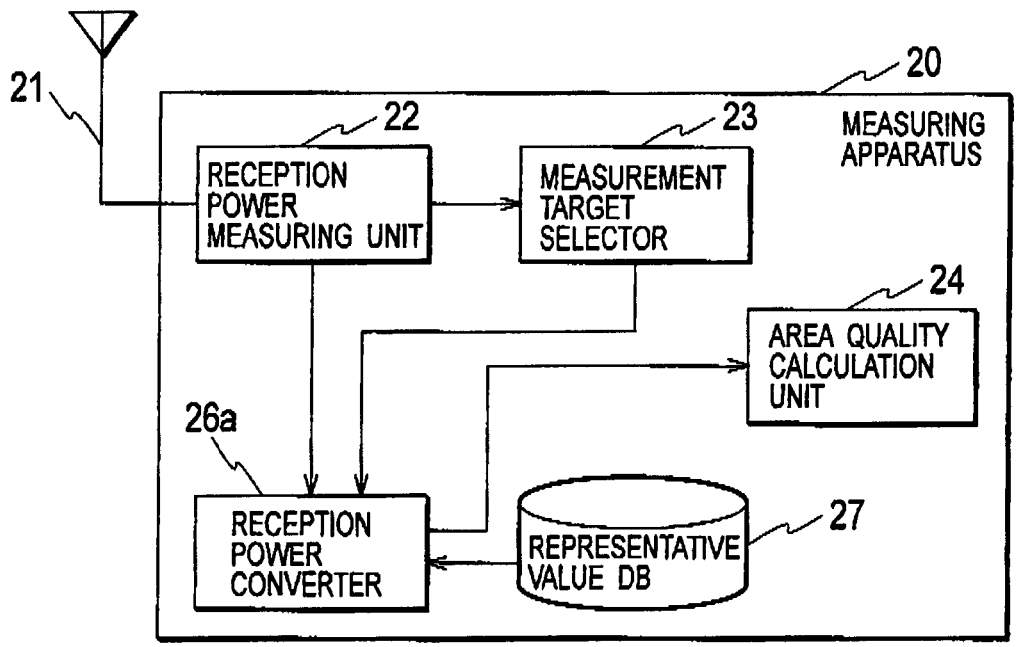
FIG. 9 is a block diagram showing a configuration of a measuring apparatus 20 according to a third embodiment of the present invention.

A description will be given below of a measuring apparatus according to the third embodiment of the present invention with reference to the drawings. FIG. 9 is a block diagram showing the configuration of the measuring apparatus 20 according to the third embodiment of the present invention.

As shown in FIG. 9, in addition to the configuration shown in FIG. 4, the measuring apparatus 20 includes a representative value DB 27, and a reception power converter 26a. Since the configurations of the antenna 21, the reception power measuring unit 22, and the measurement target selector 23 are similar to those of the above-described first and second embodiments, a description thereof will be omitted.

Figures 10, 11:
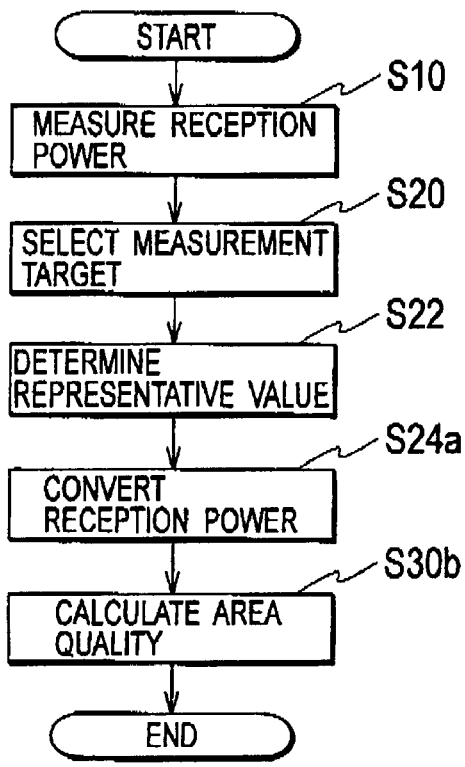
FIG. 10 is a view showing an example of information stored in a representative value DB 27 according to the third embodiment of the present invention.
FIG. 11 is a flowchart showing operations of the measuring apparatus 20 according to the third embodiment of the present invention.

As shown in FIG. 10, the representative value DB 27 stores features of areas, features of measurement environments, and the conversion ratio representative values (r) in association with one another. Hereinafter, the features of the areas and the features of the measurement environments will be referred to as the geographical features as appropriate.

For example, the conversion ratio representative values (r) are determined in response to the geographical features in the following manner. Specifically, with regard to the features of the areas, the number of mobile stations 30 concurrently making communications is supposed to be larger in the order of a rural area, a suburban area and an urban area. Accordingly, it is supposed that a size of the cells 1 is designed to be smaller in the order of the rural area, the suburban area, and the urban area. For this reason, the conversion ratio representative values (r) are determined to be smaller in the order of the rural area, the suburban area, and the urban area. Specifically, in the urban area where the size of the cells 1 is designed to be small, the conversion ratio representative value (r) is determined to be small so that the largest amount of transmission powers of the communication channels can be ensured.

With regard to the features of the measurement environments, it is generally supposed that a size of the indoor cell 1 is designed to be smaller than a size of the outdoor cell 1. For this reason, the indoor conversion ratio representative value (r) is determined to be smaller than the outdoor conversion ratio representative value (r).

When the base station 10 is placed on an upper floor of a high-rise building, the transmission power of the constant power signal is set high so that the base station 10 would not be affected by the interference of the downlink signals transmitted by the other base stations 10. For this reason, when the measuring apparatus 20 is located in the cell 1 managed by the base station 10 placed on the upper floor of the high-rise building, the conversion ratio representative value (r) is determined high even if the measurement area k is an indoor area.

With regard to the information stored in the representative value DB 27, the measuring apparatus 20 may have the information in advance, or may acquire the information as appropriate from the network.

The reception power converter 26a determines the conversion ratio representative value (r) in response the geographical features of the measurement area k, and reads the determined conversion ratio representative value (r) from the representative value DB 27. Moreover, on the basis of the read conversion ratio representative value (r), the reception power converter 26a converts the reception power (Rxi) of the constant power signal, which is measured by the reception power measuring unit 22, and obtains the converted reception power. Specifically, the reception power converter 26a divides the reception power (Rxi) of the constant power signal by the conversion ratio representative value (r). Thereby, the converted reception power (Rxi/r) is obtained.

Note that the reception power conversion unit 26a obtains the converted reception powers (Rxi/r) for the reception power of the constant power signal, which is selected by the measurement target selector 23, and the reception powers of the constant power signals, which are not selected by the measurement target selector 23.

The area quality calculation unit 24 measures the area quality in the measurement area k by using the converted reception power (RXi/r) obtained by the reception power converter 26a. Specifically, the area quality calculation unit 24 calculates the area quality (Gk) of the measurement area k on the basis of the following expression (3).

In the third embodiment, a description will be given of the configuration of the measuring apparatus 20 on the supposition that the reception power of the constant power signal, which the base station 10a transmits by using the constant power channel, is selected by the measurement target selector 23 in a similar way to that of the above-described first embodiment.

[Expression 5]

$$Gk = (Rx1/r) / \left( \sum_{i=2}^{5} Rxi/r \right) \quad (3)$$

(Operation of Measuring Apparatus)

A description will be given of operations of the measuring apparatus according to the third embodiment of the present invention with reference to the drawing. FIG. 11 is a flowchart showing operations of the measuring apparatus 20 according to the third embodiment of the present invention. Incidentally, since Steps 10 and 20 are similar to those in the processing of the above-described first and second embodiments, a description thereof will be omitted.

In Step 22, the measuring apparatus 20 determines a conversion ratio representative value (r) in response to the geographical features of the measurement area k, and reads the determined conversion ratio representative value (r) from the representative value DB 27.

In Step 24a, on the basis of the conversion ratio representative value (r) read in Step 22, the measuring apparatus 20 converts the reception power (Rxi) of the constant power signal, which is measured by the reception power measuring unit 22, and obtains the converted reception power (Rxi/r).

In Step 30b, on the basis of the converted reception power (Rxi/r) obtained in Step 24a, the measuring apparatus 20 calculates the area quality in the measurement area k. Specifically, as described above, the measuring apparatus 20 calculates the area quality (Gk) on the basis of the expression (3).

[Expression 6]

$$Gk = (Rx1/r) / \left( \sum_{i=2}^{5} Rxi/r \right) \quad (3)$$

Fourth Embodiment

A description will be given below of a fourth embodiment of the present invention with reference to the drawings. The following description will be mainly given of different points of the fourth embodiment from those of the above-described first embodiment.

Specifically, while the measuring apparatus 20 has been described in the above-described first embodiment on the premise that the measuring apparatus 20 receives the constant power signals transmitted by the plurality of base stations 10, a description will be given in the fourth embodiment on the premise that the measuring apparatus 20 has only been able to receive the constant power signal transmitted by one base station 10.

(Configuration of Measuring Apparatus)

Figures 12, 13:
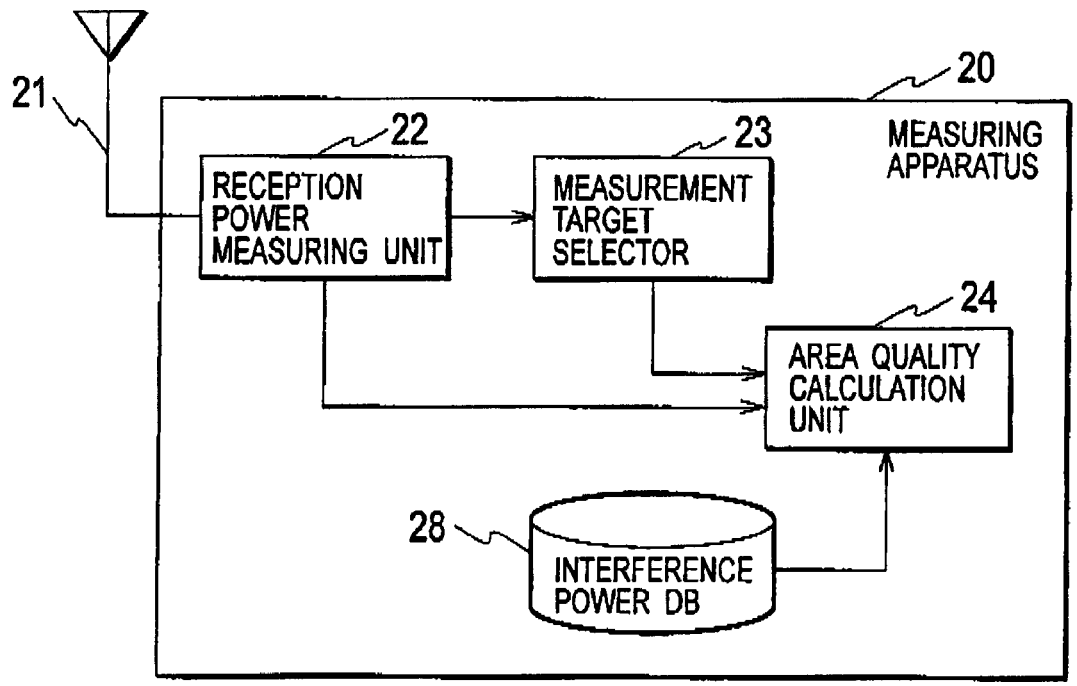
FIG. 12 is a block diagram showing a configuration of a measuring apparatus 20 according to a fourth embodiment of the present invention.
FIG. 13 is a view showing an example of information stored in an interference DB 28 according to the fourth embodiment of the present invention.

A description will be given below of the measuring apparatus according to the fourth embodiment of the present invention with reference to the drawings. FIG. 12 is a diagram showing the configuration of the measuring apparatus 20 according to the fourth embodiment of the present invention.

As shown in FIG. 12, in addition to the configuration shown in FIG. 4, the measuring apparatus 20 includes an interference power DB 28. Incidentally, since the configurations of the antenna 21, the reception power measuring unit 22, and the measurement target selector 23 are similar to those of the above-described first embodiment, a description thereof will be omitted.

In the fourth embodiment of the present invention, the description will be given on the supposition that the measuring apparatus 20 has only been able to receive the constant power signal transmitted by the base station 10a. For this reason, the measuring target selector 23 unfailingly selects the constant power signal transmitted by the base station 10a as a base for measurement of the area quality.

As shown in FIG. 13, the interference power DB 28 stores the features of areas, the features of measurement environments, and interference power estimated values (I) in association with one another. Hereinafter, the features of the areas and the features of the measurement environments will be referred to as the geographical features as appropriate.

For example, the interference power estimated values (I) are determined in response to the geographical features in the following manner. Specifically, with regard to the features of the areas, the number of base stations 10 and mobile stations 30 is supposed to be larger in the order of the rural area, the suburban area and the urban area. Accordingly, the interference power estimated values (I) are determined to be higher in the order of the rural area, the suburban area, and the urban area.

Moreover, with regard to the features of the measurement environments, since indoor measurement environments are shielded with building walls and the like, the interference power estimated values (I) of the indoor measurement environments are determined to be smaller than the interference power estimated values (I) of outdoor measurement environments. However, in a case where each indoor measurement environment is an upper floor of the high-rise building, the interference power estimated value (I) is determined to be larger than in a case where each indoor measurement environment is a lower floor of the high-rise building in the urban area.

With regard to the information stored in the interference power DB 28, the measuring apparatus 20 may have the information in advance, or may obtain the information as appropriate from the network.

The area quality calculation unit 24 determines the interference power estimated value (I) in response to the geographical features of the measurement area k, and reads the determined interference power estimated value (I) from the interference power DB 28. Moreover, the area quality calculation unit 24 measures the area quality in the measurement area k by using the reception power of the constant power signal, which is measured by the reception power measuring unit 22, and the interference power estimated value (I) read from the interference power DB 28. Specifically, the area quality calculation unit 24 calculates the area quality (Gk) of the measurement area k on the basis of the following expression (4).

[Expression 7]

$$Gk = Rx1/I \quad (4)$$

(Operation of Measuring Apparatus)

Figure 14:
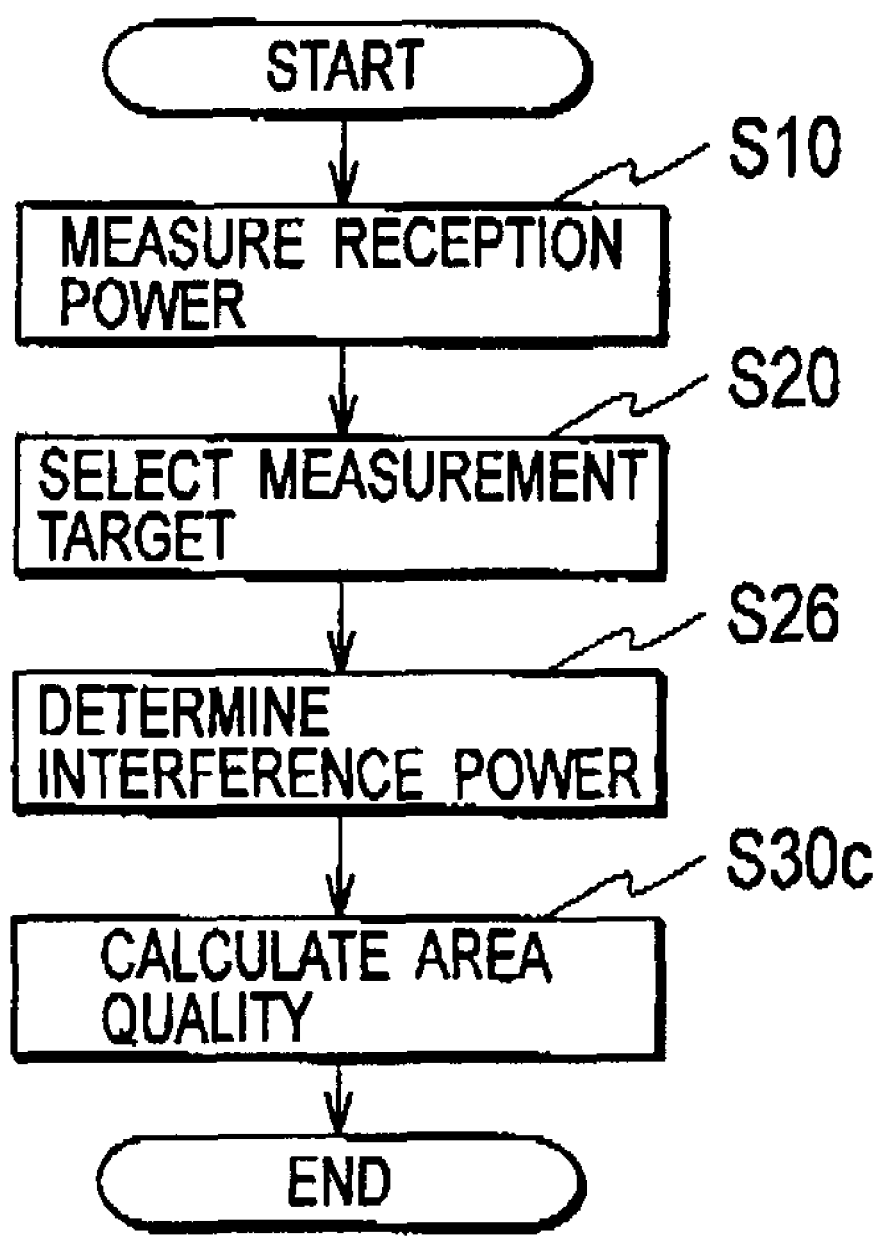
FIG. 14 is a flowchart showing operations of the measuring apparatus 20 according to the fourth embodiment of the present invention.

A description will be given of operations of the measuring apparatus according to the fourth embodiment of the present invention with reference to the drawing. FIG. 14 is a flowchart showing operations of the measuring apparatus 20 according to the fourth embodiment of the present invention. Incidentally, since Steps 10 and 20 are similar to those in the processing of the above-described first and second embodiments, a description thereof will be omitted.

In Step 26, the measuring apparatus 20 determines the interference power estimated value (I) in response to the geographical features of the measurement area k, and reads the determined interference power estimated value (I) from the interference power DB 28.

In Step 30c, the measuring apparatus 20 calculates the area quality in the measurement area k on the basis of the reception power (Rx1) of the constant power signal, which is measured in Step 10, and the interference power estimated value (I) read in Step 26. Specifically, as described above, the measuring apparatus 20 calculates the area quality (Gk) on the basis of the expression (4).

[Expression 8]

$$Gk = Rx1/I \quad (4)$$

(Effect)

In the measuring apparatus 20 according to the fourth embodiment of the present invention, the area quality calculation unit 24 calculates the area quality (Gk) of the measurement area k by using the interference power estimated value (I) determined in response to the geographical features of the measurement area k.

Hence, even if the measuring apparatus 20 can only receive the constant power signal transmitted by one base station 10, the measuring apparatus 20 can measure the area quality (Gk) of the measurement area k.

Moreover, the interference power estimated value (I) is determined in response to the geographical features of the measurement area k. Hence, this makes it possible to enhance accuracy in measuring the area quality (Gk).

Other Embodiments

While the present invention has been described with the above-described embodiments, it should not be understood that the description and the drawings, which partially compose this disclosure, restrict the present invention. From this disclosure, various alternative embodiments, examples and application technologies will be apparent for those skilled in the art.

For example, in the above-described second and third embodiments, the measuring apparatus 20 may measure the area quality in the measurement area k in consideration of thermal noises (No) generated by the measuring apparatus 20.

Specifically, the measuring apparatus 20 measures the thermal noises (No) generated by the AD converter, the DA converter, the frequency modulator and the like, and calculates the area quality based on the following expressions (5) to (7).

[Expression 9]

$$Gk = (Rx1/r_1) / \left\{ \left( \sum_{i=2}^{5} Rxi/r_i \right) + No \right\} \quad (5)$$

[Expression 10]

$$Gk = (Rx1/r_1) / \left\{ \left( \sum_{i=2}^{5} Rxi/r_i \right) + No \right\} \quad (6)$$

[Expression 11]

$$Gk = Rx1 / \left( \sum_{i=2}^{5} Rxi + No \times r \right) \quad (7)$$

Moreover, in the above-described third and fourth embodiments, the measuring apparatus 20 may measure the area quality in the measurement area k in consideration of the thermal noises (No) generated by the measuring apparatus 20. Specifically, the measuring apparatus 20 also has a function of obtaining the conversion ratio representative values (r), and a function of obtaining the interference power estimated values (I), and measures the thermal noises (No) generated by the AD converter, the DA converter, the frequency modulator, and the like. Thereafter, the measuring apparatus 20 calculates the area quality on the basis of the following expressions (8) and (9).

[Expression 12]

$$Gk = Rx1/(I + No \times r) \quad (8)$$

[Expression 13]

$$Gk = (Rx1/r)/\{(I/r) + No\} \quad (9)$$

Furthermore, the above-described second and third embodiments may be combined with each other. Specifically, in response to the measurement accuracy required for the area quality (Gk), the measuring apparatus 20 may select whether to calculate the area quality (Gk) by using the conversion ratio ($r_i$) or to calculate the area quality (Gk) by using the conversion ratio representative value (r).

For example, in a case of measuring the area quality (Gk) of a large area, it is supposed that the measuring apparatus 20 is mounted on a vehicle or the like, and that approximate area quality (Gk) is measured for the large area while the vehicle or the like on which the measuring apparatus 20 is mounted is moving at a high speed. Meanwhile, in a case of measuring the area quality (Gk) for a small area, it is supposed that the measuring apparatus 20 is carried by an operator or the like, and that detailed area quality (Gk) is measured for the small area while the operator or the like carrying the measuring apparatus 20 moves at a low speed in the indoor.

For this reason, in the case of measuring the area quality (Gk) of the large area, the measuring apparatus 20 calculates the area quality (Gk) by using the conversion ratio representative value (r) for which calculation time is short, even though the measurement accuracy thereof is inferior to that of the conversion ratio ($r_i$). Meanwhile, in the case of measuring the area quality (Gk) of the small area, the measuring apparatus 20 calculates the area quality (Gk) by using the conversion ratio ($r_i$) with which the measurement accuracy is high, even though the calculation time therefore is longer than that of the conversion ratio representative value (r).

Moreover, in the urban area where a density of the base stations 10 is high, it is supposed that variations in the transmission powers of the constant power channels at which the base stations 10 transmit the constant power signals are large. For this reason, in the urban area, there is apprehension that accuracy in measuring the area quality (Gk) is largely deteriorated when the conversion ratio representative value (r) is used. In contrast, in the rural area where the density of the base stations 10 is low, it is supposed that the variations in the transmission powers of the constant power channels at which the base stations 10 transmit the constant power signals are small. Thus, in the rural area, the deterioration of accuracy in measuring the area quality (Gk) is low even when the conversion ratio representative value (r) is used.

Accordingly, the measuring apparatus 20 calculates the area quality (Gk) by using the conversion ratio representative value (r) in the case of measuring the area quality (Gk) of the rural area, and calculates the area quality (Gk) by using the conversion ratio ($r_i$) in the case of measuring the area quality (Gk) of the urban area.

As described above, when the measurement accuracy required for the area quality (Gk) is high, the measuring apparatus 20 calculates the area quality (Gk) by using the conversion ratio ($r_i$). On the other hand, when the measurement accuracy required for the area quality (Gk) is low, the measuring apparatus 20 calculates the area quality (Gk) by using the conversion ratio representative value (r). Accordingly, a processing load of the measuring apparatus 20 is reduced.

What is claimed is:

1. A measuring apparatus for measuring service quality in an area in a communication system in which a plurality of base stations use one frequency band for transmitting downlink signals, wherein the service quality in an area provides an indication of the numbers of concurrently settable communication channels, the measuring apparatus comprising:
   a receiver configured to receive constant power signals that are the downlink signals transmitted by the respective base stations through constant power channels in which transmission powers are constant;
   a reception power measuring unit configured to measure reception powers of the constant power signals transmitted by the respective base stations;
   a reception power selector configured to select a reception power which is a base for measurement of the service quality in the area, out of the reception powers measured by the reception power measuring unit;
   a ratio information obtaining unit configured to obtain conversion ratios each of which is a ratio of a transmission power of a constant power channel corresponding to a respective base station, to a maximum transmission power corresponding to the respective base station;
   a reception power converter configured to convert the reception powers measured by the reception power measuring unit on the basis of the respective conversion ratios obtained by the ratio information obtaining unit, and to calculate converted reception powers for the respective constant power channels; and
   an area quality measuring unit configured to measure the service quality in the area on the basis of a total of the converted reception power corresponding to the reception power selected by the reception power selector, and the converted reception powers corresponding to the reception powers not selected by the reception power selector.

2. The measuring apparatus according to claim 1, wherein the area quality measuring unit measures the service quality in the area on the basis of thermal noise generated by the measuring apparatus, in addition to the converted reception power corresponding to the reception power selected by the reception power selector, and the total of the converted reception powers corresponding to the reception powers not selected by the reception power selector.

3. The measuring apparatus according to claim 1, further comprising an interference power obtaining unit configured to obtain an interference power estimated value determined in response to a geographical feature of the area,
   wherein, when the reception power measuring unit measures only one reception power, the area quality measuring unit measures the service quality in the area on the basis of the reception power measured by the reception power measuring unit and the interference power estimated value obtained by the interference power obtaining unit.

4. An area quality measuring method for measuring service quality in an area in a communication system in which a plurality of base stations use one frequency band for transmitting downlink signals, wherein the service quality in an area provides an indication of the numbers of concurrently settable communication channels, the method performed at a measuring apparatus and comprising the steps of:

- receiving constant power signals that are the downlink signals transmitted by the respective base stations by using constant power channels in which transmission powers are constant;
- measuring reception powers of the constant power signals transmitted by the base stations;
- selecting a reception power which is a base for measurement of the service quality in the area, out of the reception powers measured;
- obtaining conversion ratios each of which is a ratio of a transmission power of a constant power channel corresponding to a respective base station, to a maximum transmission power corresponding to the respective base station;
- converting the measured reception powers on the basis of the respective obtained conversion ratios and calculating converted reception powers for the respective constant power channels; and
- measuring the service quality in the area on the basis of a total of the converted reception power corresponding to the selected reception power selected in the selecting step, and the converted reception powers corresponding to the reception powers not selected in the selecting step.

* * * * *